Aug. 21, 1956   R. G. STREUBER ET AL   2,760,143
AUTOMATIC POLARITY CONTROL
Filed June 10, 1953   2 Sheets-Sheet 1

INVENTORS
Rudolf G. Streuber
Harold E. Van Hoesen and
Ralph E. Willison
BY Harold T. Stowell
ATTORNEY

United States Patent Office 2,760,143
Patented Aug. 21, 1956

2,760,143

AUTOMATIC POLARITY CONTROL

Rudolf G. Streuber and Harold E. Van Hoesen, Somerville, and Ralph E. Willison, North Branch, N. J., assignors to Research Corporation, New York, N. Y., a corporation of New York Application June 10, 1953, Serial No. 360,648

8 Claims. (Cl. 321—50)

This invention relates to automatic polarity control systems for electrical precipitators, more particularly to such precipitators employing mechanical rectification, and has for its primary object the provision of a system for insuring at all times that the polarity of the precipitator's charge is correct.

High voltage electrical precipitators often employ rotary mechanical rectifiers of the synchronous converter type to convert the commercially available alternating current, stepped up by means of a transformer to a suitable high voltage level, into direct current. In each installation it is usually necessary to maintain a definite polarity of the respective electrodes, the discharge electrode being most commonly ungrounded and held at negative polarity, while the collector electrode is grounded and held positive. In either case, discharge at reversed polarity from that for which the system is designed is undesirable and leads to improper operation. When using a synchronous motor to drive a mechanical rectifier, as is the common practice, the arrangement is usually such that the rectifier may lock in step with either the positive or negative half of the alternating current wave when first started, and therefore the direct current polarity applied to the precipitator electrodes has an equal chance of being in either direction. Arrangements are known using an auxiliary mechanical rectifier rotating synchronously with the main rectifier for operating a reversing switch to reverse the supply to the primary side of the transformer in the event that the original polarity comes out wrong when the system is first started up. Since industrial precipitators are usually intended for continuous or at least heavy duty operation, great difficulty has been found with mechanical rectifiers of the above type due to the long-continued operation of the mechanical members involved, with the resultant wear and tear requiring considerable maintenance of these elements.

It is a primary object of the present invention to substantially eliminate the above difficulties and to provide a system, interchangeable with the above described systems, for insuring correct polarity without the use of continuously moving parts. It is another object to provide an inexpensive device of this character which is simple in construction and operation, which requires no attention in normal use, and no particular skill or judgment on the part of the operator.

The specific nature of the invention, as well as other objects and advantages thereof, will clearly appear from a description of a preferred embodiment as shown in the accompanying drawings, in which.

Figure 1:
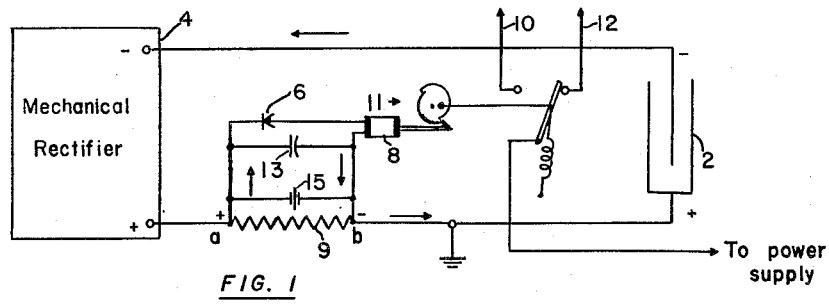
Fig. 1 is a schematic diagram illustrating the principle of the invention and showing current flow with correct polarity.

Referring to Fig. 1, precipitator 2 is shown as energized by the output of mechanical rectifier 4. If the current flow is as shown by the arrows in the diagram, which is taken to be the correct polarity for this particular installation, then it will be apparent that the polarity at $a$ being positive and at $b$ negative due to the current flow through resistor 9, no current will flow through the rectifier 6, which may be a selenium rectifier, and hence no current will flow through the relay winding 8 in series with the rectifier. The relay 8 actuates sequence switch 11 in such fashion that whenever the relay is energized the switch is moved from the position which it happens to occupy at that time to the opposite position, thus energizing successively leads 10 and 12 on successive operations of the relay. Leads 10 and 12 are associated with the respective reversing circuits of a transformer reversing switch, as will be later shown, so that whenever the relay is actuated, the transformer primary circuit connections are reversed. As shown in Fig. 1, with the correct polarity, the relay will not be actuated and the reversing switch will remain in its initial position, since this happens to be the correct position for operation at the desired polarity. A by-pass capacitor 13 is provided for smoothing purposes, and a surge protector 15 is connected across resistor 9 to keep surges out of the resistors and the tube circuit by acting as an effective short circuit against surges which might damage or interfere with the operation of the polarity equipment.

Figure 2:
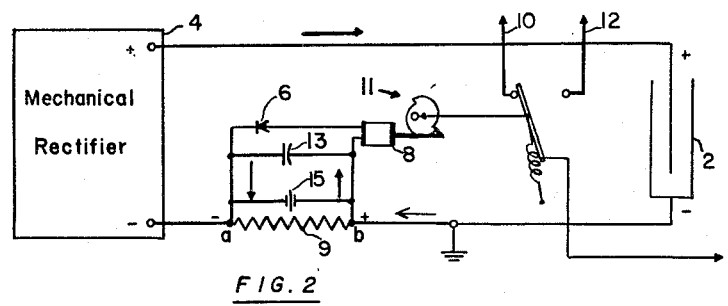
Fig. 2 is a similar schematic diagram showing current flow with incorrect polarity.

Fig. 2 shows the operation when the initial polarity turns out to be incorrect. In this case, the current flow is in the opposite direction from Fig. 1; the potential at $b$ is therefore higher than that at $a$, and relay 8 is therefore energized, since current can now flow through the rectifier 6. The relay sequence switch is accordingly energized to reverse the connections to the transformer, which will reverse the polarity and establish conditions as shown in Fig. 1.

Figure 3:
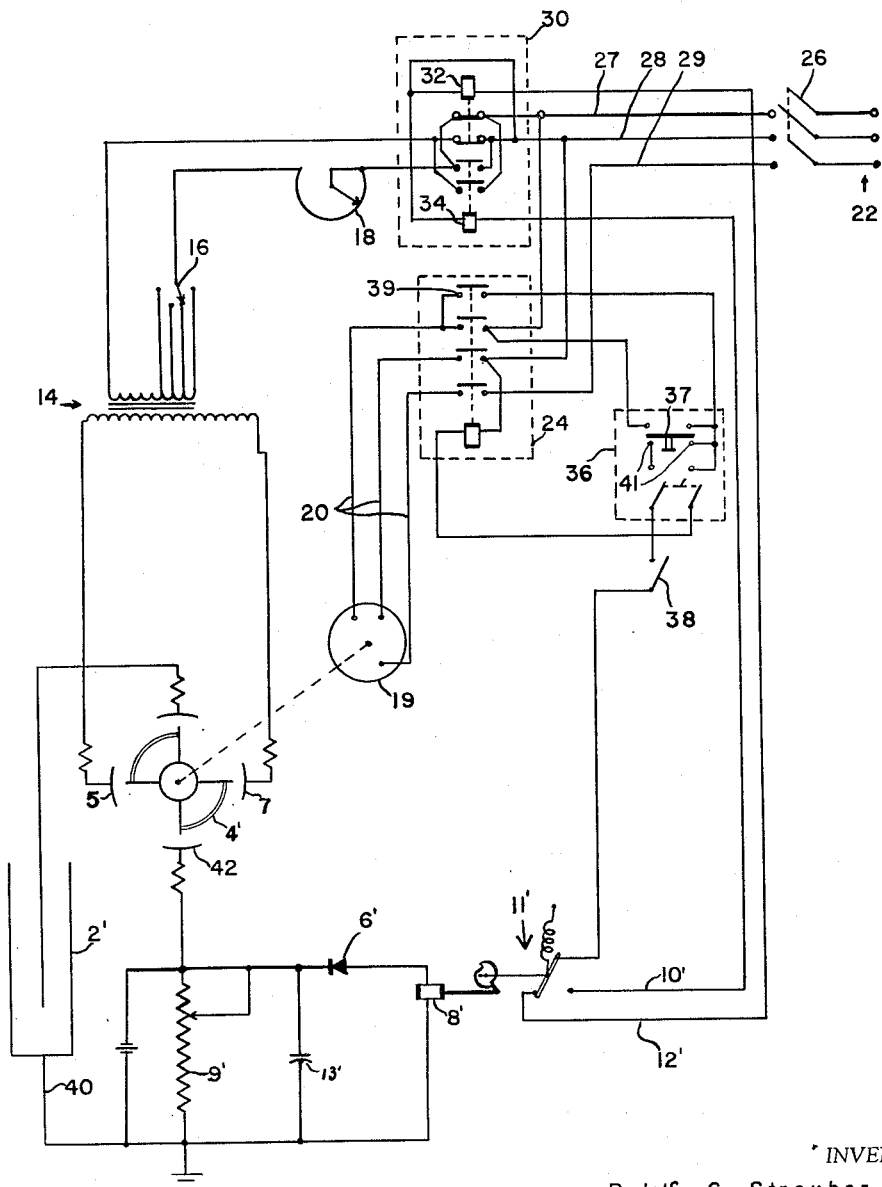
Fig. 3 is a circuit diagram showing the entire electrical system of a precipitator embodying the invention.

Fig. 3 shows a complete precipitator circuit embodying the above principle. Precipitator 2' is energized by current from mechanical rectifier 4', which is of the conventional type. The rectifier contacts 5 and 7 are supplied with high voltage by transformer 14, the primary side of which is provided with a conventional tap switch 16 for adjusting the secondary voltage, rheostat 18 being provided for fine adjustment between steps of the tap switch. Rectifier 4' is driven by motor 19 which is energized through leads 20 from supply source 22 through a conventional motor starter 24. A conventional service switch is indicated at 26. Two leads, 27 and 28, of the three-phase supply system are used to energize the primary of transformer 14 through a reversing switch generally indicated at 30. The reversing switch is provided with two energizing relay windings 32 and 34, respective operation of which will obviously reverse the polarity of the current supplied to the transformer. A motor control switching unit is shown at 36 and a transformer control switch at 38. The function of these elements will be described in more detail below.

Connected between grounded collector terminal 40 of the precipitator and mechanical rectifier terminal 42 is a resistance element 9' corresponding to resistor 9 of Fig. 1. A rectifier 6' and sequence relay winding 8' are connected in series across resistance 9', similar to the showing of Fig. 1. Resistor 9' may be made adjustable as shown, to adjust for actual average current under working conditions, which may vary somewhat for different installations. A surge protector and condenser are provided as before.

The basic operation is generally similar to that described in connection with Figures 1 and 2. When the coil of sequence relay 8' is energized, it causes a changeover from one set of contacts to the other set. Whichever set of contacts is made, the circuit is maintained until the relay coil receives a new impulse and operates the sequence switch.

The transformer control 38 is interlocked with the motor control 36 in such a manner that it is imperative that the motor be in operation before the transformer may be connected to the circuit, in the interest of safety. Assuming that the transformer control switch 38 is closed first, the motor control switch 36 second, and the motor starting button 37 then pressed, the motor will start, but the transformer 14 remains disconnected until the motor starting switch 24 is closed, held closed on auxiliary contact 39, and the push button released which finally closes the circuit to transformer control switch 38 through the back contacts 41 of the push button switch. This introduces a necessary time element and insures that the motor is locked into step before the transformer is connected. If the high voltage polarity is correct, that is, negative to the discharge electrodes of the precipitator in the installation shown, nothing further happens and the system is ready for operation. If, however, the polarity is incorrect, the grounded end of the resistor bank becomes positive relative to its upper end, and sequence relay 8' operates as previously shown, kicking over its contacts to the opposite position, thereby breaking the circuit for the energized holding coil of the magnetic reversing switch, and completing the circuit for the other magnet coil of the reversing switch. The transformer is thus brought back on the line with reverse polarity, which gives the correct direction of discharge through the precipitator.

Figure 4:
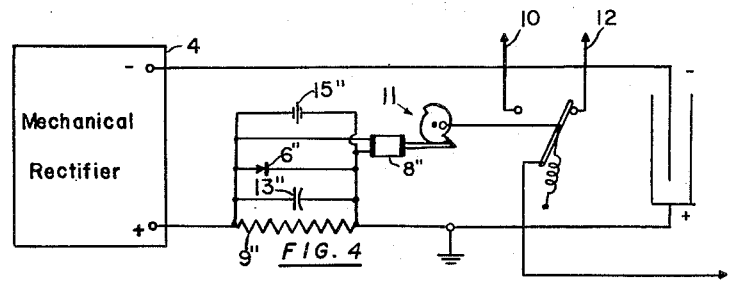
Fig. 4 is a schematic diagram of a modification of the invention.

Fig. 4 shows essentially the same method of actuating the sequence relay as that shown in Fig. 3, except that instead of a series connection, a shunt connection of the asymmetrical conducting device 6" is employed. In this case, resistance 9", corresponding to resistance 9' of Fig. 3, is shunted by the asymmetrical conducting device 6" and by the relay winding 8". A smoothing or filter condenser 13" may also be inserted as shown if desired. It will be apparent that with this arrangement the asymmetrical conducting device (which may obviously be of any type, either crystal or thermionic) shorts the relay coil 8" when the polarity is correct. When the polarity is wrong, the asymmetrical device 6" blocks current flow and therefore forces the current to flow through the sequence relay winding 8" to energize a reversing switch as before.

Figure 5:
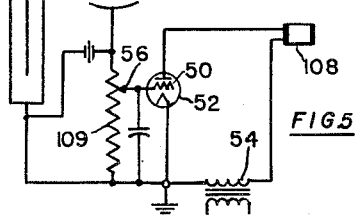
Fig. 5 is a schematic diagram of another modification, showing the use of a grid-controlled vacuum tube.

For greater sensitivity of control, it will be apparent that a grid controlled vacuum tube may be employed. Such an arrangement is shown in Fig. 5. In this figure, the grid 50 of three element tube 52 derives its potential from resistor 109 which corresponds to resistor 9' of Fig. 3. The voltages are so adjusted that the tube passes current when the polarity of the precipitator is, for example, positive and blocks current flow when the polarity is negative. Passage of current through the tube energizes the winding of the sequence relay 108 as before. Transformer 54 is provided as a current source for the tube and relay circuit. The control voltage for the grid 50 may be adjusted by means of a variable tap 56 on the resistor.

Figure 6:
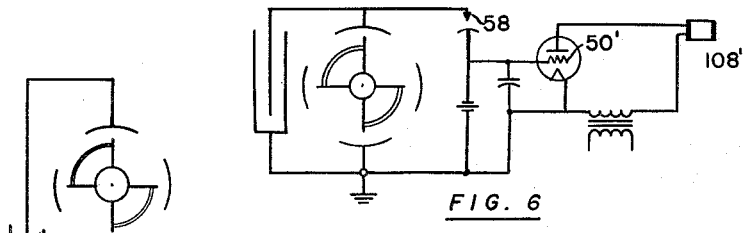
Fig. 6 discloses a modification of Fig. 5, wherein the grid is controlled by precipitator voltage instead of current.

The arrangement of Fig. 5 depends for its point of operation upon the value of current flow through resistor 109. As the current flow may be varied through a wide range, it may be preferable in some cases to energize the grid by precipitator voltage instead of precipitator current. Such an arrangement is shown in Fig. 6, where a gap 58 is provided to secure the necessary potential on grid 50' for control of current flow in the circuit to energize sequence relay 108'. As a precipitator is operated at a voltage close to the arc-over point, this voltage is fairly constant, and may therefore profitably be employed for this purpose.

It will be apparent that the embodiments shown are only exemplary and that the various modifications can be made in construction and arrangement within the scope of our invention as defined in the appended claims.

We claim:

1. Polarity control means for the electrodes of an electrical precipitator system having a step-up transformer and a mechanical rectifier driven by a synchronous motor, comprising a reversing switch for the primary of said transformer, a sequence relay adapted to reverse the polarity of current to said transformer through said reversing switch upon successive actuations of said sequence relay, and an asymmetrical conducting device energized by rectified voltage from said rectifier for controlling the operation of said sequence relay in accordance with the polarity of voltage applied to said asymmetrical conducting device.

2. The invention according to claim 1, including a resistor in the rectified output circuit of said rectifier, said asymmetrical conducting device and sequence relay being connected across said resistor.

3. The invention according to claim 2, said asymmetrical conducting device and sequence relay being in series.

4. The invention according to claim 2, said asymmetrical conducting device and sequence relay being in parallel.

5. The invention according to claim 2, including a surge protector connected across said resistor.

6. The invention according to claim 1, said asymmetrical conducting device being a grid controlled vacuum tube so arranged that the polarity of the rectified output controls the relative polarity of the grid and cathode of the vacuum tube.

7. The invention according to claim 6, including a resistor in the rectified output circuit of said rectifier, the grid and cathode of said vacuum tube being connected across said resistor.

8. The invention according to claim 6, and a discharge gap connected between the high voltage output side of said rectifier and the grid of said vacuum tube.

References Cited in the file of this patent
UNITED STATES PATENTS

| | | |
|---|---|---|
| 2,193,421 | Janetschke | Mar. 12, 1940 |
| 2,297,472 | Hahn et al. | Sept. 29, 1942 |